US012582132B2

(12) United States Patent
Yang et al.

(10) Patent No.: US 12,582,132 B2
(45) Date of Patent: Mar. 24, 2026

(54) GERMINATION/SPROUTING AND FRUIT RIPENING REGULATORS

(71) Applicant: The United States of America, as represented by the Secretary of Agriculture, Washington, DC (US)

(72) Inventors: Tianbao Yang, Rockville, MD (US); Jorge M. Fonseca, Hyattsville, MD (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 190 days.

(21) Appl. No.: 17/702,180

(22) Filed: Mar. 23, 2022

(65) Prior Publication Data

US 2022/0304321 A1 Sep. 29, 2022

Related U.S. Application Data

(60) Provisional application No. 63/165,983, filed on Mar. 25, 2021.

(51) Int. Cl.

| | |
|---|---|
| ***A23B 7/10*** | (2006.01) |
| ***A01N 43/56*** | (2006.01) |
| ***A01P 21/00*** | (2006.01) |
| ***A23B 2/771*** | (2025.01) |
| ***A23B 7/154*** | (2006.01) |
| ***A23B 9/26*** | (2006.01) |

(52) U.S. Cl.

CPC ................ *A23B 7/10* (2013.01); *A01N 43/56* (2013.01); *A01P 21/00* (2021.08); *A23B 2/771* (2025.01); *A23B 7/154* (2013.01); *A23B 9/26* (2013.01)

(58) Field of Classification Search

CPC .. A23B 7/10; A23B 2/771; A23B 9/26; A23B 7/154; A01N 43/56; A01P 21/00

See application file for complete search history.

(56) References Cited

U.S. PATENT DOCUMENTS

| | | | | |
|---|---|---|---|---|
| 4,225,338 | A * | 9/1980 | Nusslein | C07C 275/28 558/392 |
| 4,401,454 | A | 8/1983 | Fritz et al. | |
| 10,337,023 | B2 | 7/2019 | Gil et al. | |
| 10,448,632 | B2 | 10/2019 | Cutler et al. | |
| 10,905,120 | B2 | 2/2021 | Cutler et al. | |
| 2013/0045952 | A1 | 2/2013 | Xu et al. | |
| 2015/0047073 | A1 | 2/2015 | Cutler et al. | |
| 2017/0000143 | A1 | 1/2017 | Trainer | |
| 2018/0146666 | A1 | 5/2018 | Cutler et al. | |
| 2019/0000084 | A1 | 1/2019 | Zhu et al. | |
| 2022/0304322 | A1* | 9/2022 | Yang | A23L 3/3544 |

FOREIGN PATENT DOCUMENTS

| | | | | |
|---|---|---|---|---|
| CN | 106135271 A * | 11/2016 | A01G 7/06 |
| JP | 2004002228 A * | 1/2004 | |
| WO | WO-2012036523 A2 * | 3/2012 | A01N 43/08 |
| WO | WO-2017112827 A1 * | 6/2017 | A01G 22/00 |
| WO | 2020/127319 | 6/2020 | |

OTHER PUBLICATIONS

CAS registry entry for RN 876885-00-6, entered registry Sep. 10, 2006.*

CAS Registry entry 955572-85-7, entered Nov. 22, 2007, no pagination.*

CAS registry entry 878438-48-3, entered Mar. 29, 2006, no pagination.*

CAS Registry entry 905534-49-8, entered Aug. 31, 2006, no pagination.*

CAS Registry entry 493002-79-2, entered Feb. 21, 2003, no pagination.*

CAS Registry entry 874592-16-2, entered Feb. 19, 2006, no pagination.*

CAS Registry entry 718603-76-0, entered Jul. 29, 2004 , no pagination.*

CAS Registry entry 957479-92-4, entered Dec. 11, 2007, no pagination.*

CAS Registry entry 494217-04-8, entered Feb. 24, 2003, no pagination.*

CAS Registry entry 838849-77-7, entered Feb. 28, 2005, no pagination.*

N.K. Given et al., 1988, "Hormonal regulation of ripening in the strawberry, a non-climacteric fruit," Planta 174: 402-406.

M.K. Gupta, 2020, Agonist, antagonist and signaling modulators of ABA receptor for agronomic and post-harvest management, Plant Physiol. Biochem. 148: 10-25.

Q. Hao, et al., 2010, "Functional Mechanism of the Abscisic Acid Agonist Pyrabactin," J. Biol. Chem. 285(37):28946-28952.

A.S. Vaidya et al., 2019, "Dynamic control of plant water use using designed ABA receptor agonists," Science 366, eaaw8848.

International Search Report on PCT/US2022/021672, dated Jul. 4, 2022.

Written Opinion of the International Searching Authority on PCT/US2022/021672, dated Jul. 4, 2022.

* cited by examiner

*Primary Examiner* — Ali Soroush
*Assistant Examiner* — Andriae M Holt
(74) *Attorney, Agent, or Firm* — John Fado; Maria Restrepo-Hartwig

(57) ABSTRACT

The invention relates to compositions comprising at least one ABA agonist for inhibiting plant or plant part germination/sprouting, and/or promoting fruit ripening and pigmentation; kits comprising such compositions; and methods of using such compositions to inhibiting plant or plant part germination/sprouting and promoting fruit ripening and pigmentation.

14 Claims, 3 Drawing Sheets
(3 of 3 Drawing Sheet(s) Filed in Color)

10 μM CAD

200 μM ABA

Mock

Control

10 μM CAD

200 μM ABA

Mock

Control

GERMINATION/SPROUTING AND FRUIT RIPENING REGULATORS

CROSS-REFERENCE TO RELATED APPLICATIONS

This application claims the benefit of U.S. Provisional Patent Application No. 63/165,983, filed Mar. 25, 2021, which is incorporated herein by reference in its entirety.

FIELD OF THE INVENTION

The invention relates to compositions comprising at least one abscisic acid (ABA) agonist for delaying germination/sprouting of plants and plant parts, and/or promoting fruit ripening and pigmentation; kits comprising such compositions; and methods of using such compositions.

BACKGROUND OF THE INVENTION

Fresh fruits are highly perishable. They have a short shelf-life such that about 40% of fresh fruits are wasted after harvest. Fruit quality and shelf life depend much on the control of the fruit ripening process. However, control of fruit ripening has proven a difficult task given the complex developmental processes that are involved. Among other biological changes, during ripening fruits undergo accumulation of pigments that are characteristic of the ripen fruits, softening, and accumulation of sugars, acids, and volatile compounds. This overall maturation process involves numerous physiological, biochemical, and structural alterations, and is subject to hormonal controls. Based on the physiological differences in respiratory pattern during ripening, fleshy fruits have been categorized as climacteric and non-climacteric. Climacteric fruits such as tomato, banana, apple, mango, and kiwi, commonly contain sufficient long-chain carbohydrates after reaching the “physiological maturity index” to sustain respiration and their transformation into simple sugars during postharvest handling. In contrast, non-climacteric fruits such as strawberries, melons, pineapples, grapes and citrus fruits, do not show a distinct peak in respiration, and ethylene production remains low. Maturation of non-climacteric fruit proceeds at a relatively slow rate, and some of the typical ripening changes (e.g. sugar accumulation and its subsequent effect on sweetness) are not prominent if the fruit is detached from the plant at any stage before the full ripen stage.

Adverse weather events, such as storms, frost, and hail, can severely damage or destroy fruit crops before they are ready for harvest. Shortening the time fruit is on the plant, vine, or tree reduces the risk of weather-related damage, but this may cause the fruit to be harvested at suboptimal times such that the fruit is not yet sufficiently ripe.

Many climacteric fruits may be intentionally harvested before they are fully ripe while conditions are favorable to harvest. Non-climacteric fruits are left to ripe on the plant, vine, or tree because once the fruit is harvested, the fruit’s desirable properties, such as taste, color, and texture, typically do not improve. Because non-climacteric fruits are ideally ripe when they are harvested, non-climacteric fruit can be more difficult to store, and spoil more easily or faster than climacteric fruits. This is where adverse weather conditions can play a pivotal role. If a storm or hail is predicted and the fruit is not quite ripe, the fruit may be picked early at a suboptimum time leading to an inferior fruit quality. Reducing the amount of time fruit spend on the plant, tree, or vine reduces the changes of adverse weather-related events spoiling a crop.

Non-climacteric fruit picked early, before they are sufficiently ripe, are likely to have lower levels of total soluble solids (TSS) and higher amounts of acid measured by its titratable activity (TA) (often referred to as the “total acidity”). As fruit ripens, the amount of sugar (soluble solids) typically increases, and the acidity falls. Fruits with lower levels of TSS and higher TA are perceived as being sour or tart and are generally not preferred by consumers compared to fruits that have higher levels of TSS and lower TA. Essentially, consumers prefer a fruit that is ripe as it has more organoleptically appealing properties, such as color, taste (sweetness), and texture.

Abscisic acid (ABA) is a phytohormone that functions in many plant developmental processes, including seed and bud dormancy, the control of organ size, and stomatal closure. ABA has been shown to inhibit seed germination and promote fruit ripening. Thus, there is a need for compositions comprising ABA agonists that are not phytotoxic, are easily synthesized, and are effective in delaying plant or plant part germination/sprouting, and/or promoting fruit ripening and pigmentation.

SUMMARY OF THE INVENTION

Provided herein are compositions comprising at least one ABA agonist; kits comprising such compositions; and methods of using such compositions to delay/inhibit plant or plant part germination/sprouting, and/or hasten fruit ripening and pigmentation.

In an embodiment, the invention relates to a composition comprising at least one abscisic acid (ABA) agonist for delaying plant or plant part germination/sprouting, and/or promoting fruit ripening and pigmentation. In some embodiments of the invention, the composition for delaying plant or plant part germination/sprouting, and/or promoting fruit ripening and pigmentation comprises a carrier, an adjuvant, an auxiliary, or an extender. In some embodiments of the invention, the composition for delaying plant or plant part germination/sprouting, and/or promoting fruit ripening and pigmentation comprises a surfactant. In some embodiments of the invention, the surfactant in the composition for delaying plant or plant part germination/sprouting and/or promoting fruit ripening and pigmentation is TRITON-X100 surfactant (polyethylene glycol tert-octylphenyl ether); TRITON-X100 reduced surfactant (polyoxyethylene (10) isooctylcyclohexyl ether) cyclohexyl-polyethylene glycol); BRIJ C10 (Polyoxyethylene (10) cetyl ether); polysorbate 20; octylphenoxypoly ethoxyethanol; or nonylphenoxypolyethoxyethanol.

In some embodiments of the invention, the at least one ABA agonist is N-(4-bromo-2-ethylphenyl)-1-ethyl-1H-pyrazole-3-carboxamide (CAD); N-(4-bromophenyl)-1-ethyl-1H-pyrazole-3-carboxamide; 4-bromo-N-(2-tert-butylphenyl)-1-ethyl-1H-pyrazole-3-carboxamide; 1-[(4-methoxyphenyl)sulfony-]-3-piperidinecarboxamide, N-(3,4-dimethylphenyl)-N-(4-fluorobenzyl)methanesulfonamide; [3-(benzyloxy)benzyl]methylamine hydrochloride: 4-amino-2-(5,7-dimethyl-1,3-benzoxazol-2-yl)-6-methylphenol; N-cyclopropyl-N'-(2,3-dimethylphenyl) urea; N-[3-(1,3-benzoxazol-2-yl)-2-methylphenyl]-2-methylpropanamide; 3-[(2-fluorobenzyl)oxy]benzamide; N-[3-chloro-4-(4-propionyl-1-piperazinyl)phenyl]-2-methoxy-3-methylbenzamide, 6-chloro-N-(2,4-dimethylphenyl)-2-oxo-2H-chromene-3-carboxamide; methyl 2-{[(4-cyclohexyl-1- piperazinyl)carbonyl]amino}benzoate; or a derivative thereof. In some embodiments of the invention, exposure of plants or plant parts to a composition of the invention delays germination and/or hastens fruit ripening and pigmentation in climacteric or non-climacteric plants or plant parts as compared to climacteric or non-climacteric plants or plant parts not exposed to the composition.

In an embodiment, the invention relates to a kit for delaying plant or plant part germination/sprouting, and/or hastening fruit ripening and pigmentation, the kit comprising a composition comprising at least one ABA agonist. In some embodiments of the invention, the composition comprising at least one ABA agonist in the kit for delaying plant or plant part germination/sprouting, and/or hastening fruit ripening and pigmentation further comprises a carrier, an adjuvant, an auxiliary, or an extender. In some embodiments of the invention, the composition comprising at least one ABA agonist in the kit for delaying plant or plant part germination/sprouting, and/or hastening fruit ripening and pigmentation comprises a surfactant. In some embodiments of the invention, the surfactant in the composition comprising at least one ABA agonist is TRITON-X100 surfactant (polyethylene glycol tert-octylphenyl ether); TRITON-X100 reduced surfactant (polyoxyethylene (10) isooctylcyclohexyl ether); BRIJ C10 (Polyoxyethylene (10) cetyl ether); polysorbate 20; octylphenoxypoly ethoxyethanol; or nonylphenoxypolyethoxyethanol.

In an embodiment, the invention relates to a method for delaying plant or plant part germination/sprouting, and/or hastening fruit ripening and pigmentation, the method comprising exposing a plant or a plant part to a composition comprising at least one ABA agonist. In some embodiments of the invention, exposure of a plant or plant part to a composition of the invention delays germination/sprouting when compared to the germination/sprouting of a plant or plant part not exposed to the composition. In some embodiments of the invention, exposure of a plant or plant part to a composition of the invention hastens fruit ripening and pigmentation when compared to fruit from a plant or plant part not exposed to the composition.

In some embodiments, the method of the invention delays plant or plant part germination/sprouting, and/or hastens fruit ripening and pigmentation of climacteric or non-climacteric fruit. In some embodiments of the invention, the plant or plant part contacted with the ABA agonist is a seed. In some embodiments of the invention, the plant or plant part contacted with the ABA agonist is a fleshy fruit

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 2A shows images taken 7 DAT; all strawberries appear white with a greenish tint, except for the CAD treated strawberries which appear white have a pink tint. FIG. 2B shows images taken 8 DAT, all the mock-treated strawberries appear white with a greenish tint, all ABA-treated strawberries appear white, all CAD-treated strawberries appear with pink spots. FIG. 2C shows images taken 9 DAT, mock-treated strawberries have a pinkish tint, ABA-treated strawberries appear with more pink, CAD-treated strawberries appear mostly red. FIG. 2D shows images taken 10 DAT, mock-treated strawberries and ABA-treated strawberries appear reddish, while CAD-treated strawberries appear red. FIG. 2E shows images taken 11 DAT, mock-treated and ABA-treated strawberries appear mostly red, and CAD-treated strawberries appear red allover. FIG. 2F shows images taken 12 DAT, all strawberries appear red allover.

FIG. 3A and FIG. 3B show images of cherry tomatoes injected with 10 μM CAD in 0.1% TRITON-X100 surfactant; the tomatoes in FIG. 3A appear green while the tomatoes in FIG. 3B appear dark red. FIG. 3C and FIG. 3D show images of cherry tomatoes injected with 200 μM ABA in 0.1% TRITON-X100 surfactant; the tomatoes in FIG. 3C appear green while the tomatoes in FIG. 3D appear red. FIG. 3E and FIG. 3F show images of cherry tomatoes injected with 0.1% TRITON-X100 surfactant; the tomatoes in FIG. 3E appear green while the tomatoes in FIG. 3F appear red with greenish tint. FIG. 3G and FIG. 3H show images of untreated cherry tomatoes; the tomatoes in FIG. 3G appear green while the tomatoes in FIG. 3H appear green with a reddish tint. FIG. 3A; FIG. 3C; FIG. 3E; and FIG. 3G show images taken the day of treatment. FIG. 3B; FIG. 3D; FIG. 3E; and FIG. 3H show images taken 6 DAT.

FIG. 4A shows images taken 8 DAT; control, mock-treated, and ABA-treated strawberries appear white or greenish white while CAD-treated strawberries appear with a pink tint. FIG. 4B shows images taken 9 DAT; control strawberries appear white with a greenish tint, mock-treated strawberries appear with some pink, as do ABA-treated strawberries, CAD-treated strawberries appear mostly light red. FIG. 4C shows images taken 10 DAT; control strawberries appear white with greenish tint, mock-treated and ABA-treated strawberries appear with pink/red, and CAD-treated strawberries appear red. FIG. 4D shows images taken 11 DAT; control strawberries appear white with some pink, mock-treated strawberries appear mostly reddish, ABA-treated strawberries appear reddish, and CAD-treated strawberries appear red. FIG. 4E shows images taken 12 DAT; control and mock-treated strawberries appear reddish, ABA-treated strawberries appear red, CAD-treated strawberries appear bright red. FIG. 4F shows images taken 13 DAT; control-treated, mock-treated, and ABA-treated strawberries appear red with some white at the top, while CAD-treated strawberries appear red allover.

DETAILED DESCRIPTION

Figure 1:
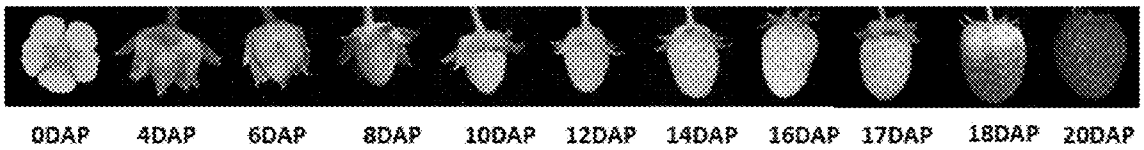
FIG. 1 depicts images of strawberry fruit development under normal conditions. Images were taken at different days after pollination (DAP) as indicated underneath the images. The first picture on the left is of a pollinated flower; up to 14 DAP the strawberries appear green; at 16 DAP the strawberry appears white; at 17 DAP the strawberry appears with a pink tint; at 18 DAP about three quarters of the strawberry appears red; and at 20 DAP the whole strawberry appears red.

The present invention relates to compositions for delaying plant or plant part germination/sprouting, and/or promoting fruit ripening and pigmentation as compared to untreated or mock-treated plant or plant part, or fruit.

Fresh fruits are highly perishable. Due to their short shelf-life about 40% of fresh fruits are wasted after harvest. Fruit quality and shelf life depend on fruit ripening, which is a complex physiological process, especially for non-climacteric fruits such as strawberry, grapes and citrus. The inventors have identified compounds useful in delaying seed germination/sprouting, promoting the fruit ripening process, and/or enhancing fruit pigmentation of climacteric and non-climacteric fruit. Prior to the instant invention there was no known efficient growth regulator to enhance non-climacteric fruit ripening, without affecting fruit quality attributes such as TSS and TA. Some of the growth regulators of the invention also promote climacteric fruit ripening, in a manner similar to abscisic acid (ABA), but more effectively.

From a collection of about 10,000 small chemical compounds (around 300-400 Dalton), the inventors selected thirteen small chemical compounds (under 300 Daltons each) that delayed seed germination. Thus, the inventors have identified compositions comprising at least one ABA agonist useful for delaying seed germination. The inventors have also identified compositions that hasten fruit ripening. The inventors identified N-(4-bromo-2-ethylphenyl)-1-ethyl-1H-pyrazole-3-chemical carboxamide (hereinafter "CAD") which can delay seed germination and promote fruit ripening. Application of 10 μM CAD in TRITON X100 surfactant to strawberries on day 9 after pollination, accelerated fruit ripening by at least about two days when compared with strawberries treated with buffer alone (mock control). In some embodiments of the invention, a composition for delaying plant/plant part germination/sprouting and/or hastening fruit ripening and pigmentation may comprise at least one of N-(4-bromo-2-ethylphenyl)-1-ethyl-1H-pyrazole-3-carboxamide (CAD), N-(4-bromophenyl)-1-ethyl-1H-pyrazole-3-carboxamide, 4-bromo-N-(2-tert-butylphenyl)-1-ethyl-1H-pyrazole-3-carboxamide, 1-[(4-methoxyphenyl)sulfonyl]-3-piperidinecarboxamide, N-(3,4-dimethylphenyl)-N-(4-fluorobenzyl)methanesulfonamide, [3-(benzyloxy)benzyl]methylamine hydrochloride, 4-amino-2-(5,7-dimethyl-1,3-benzoxazol-2-yl)-6-methylphenol, N-cyclopropyl-N'-(2,3-dimethylphenyl)urea, N-[3-(1,3-benzoxazol-2-yl)-2-methylphenyl]-2-methylpropanamide, 3-[(2-fluorobenzyl)oxy]benzamide, N-[3-chloro-4-(4-propionyl-1-piperazinyl)phenyl]-2-methoxy-3-methylbenzamide. 6-chloro-N-(2,4-dimethylphenyl)-2-oxo-2H-chromene-3-carboxamide, methyl 2-{[(4-cyclohexyl-1-piperazinyl) carbonyl]amino}benzoate.

In an embodiment, the composition for delaying plant or plant part germination/sprouting and/or hastening fruit ripening and/or pigmentation is an ABA agonist having the following formula:

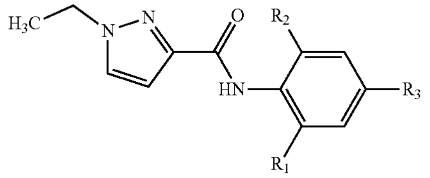

where $R_1$ is methyl or ethyl; $R_2$ is H or ethyl; and $R_3$ is H or Br.

The inventors surprisingly found that seeds contacted with the compositions of the invention germinate at a slower rate than seeds contacted with buffer alone. In the same manner, the inventors found it surprising that contacting climacteric or non-climacteric fruit with at least one composition of the invention, either on the vine or after harvest, fruit ripening was hastened as compared to mock-treated fruit, or to non-treated fruit. The ripened fruit had the organoleptically pleasing characteristics of fruit that has fully ripened on the plant. As seen in FIG. 2A to FIG. 2F, when compared with fruit treated with abscisic acid (ABA), a phytohormone which was used as a positive control, CAD was more effective in promoting fruit ripening. Treatment with 10 μM CAD allowed the strawberries to turn red two days earlier than strawberries treated with 1 mM ABA. These results demonstrated that CAD is a novel plant growth regulator that targets fruit development and ripening, without producing negative effects on fruit quality traits, such as total soluble solids, antioxidants and organic acids. The inventors surprisingly found that treatment of cherry tomatoes with CAD in TRITON-X100 surfactant also resulted in the promotion of fruit ripening and pigmentation. As seen on FIG. 3A to 3H, similar to strawberries, the CAD-treated tomatoes ripened faster than ABA-treated tomatoes. Similarly, as seen on FIG. 4A to FIG. 44F, strawberries injected with 10 μM CAD in TRITON-X100 surfactant 14 days after pollination ripened at least about two days before strawberries injected with 200 μM ABA in TRITON-X100 surfactant.

Ripening of fruits occurs when enzymes such as pectinase and amylase break down starches and pectin, which softens and sweetens the fruit. Another factor essential in fruit ripening is ethylene, a naturally occurring gas that triggers and promotes the ripening process. Climacteric fruits are those fruits that can ripen after harvest, and non-climacteric fruits are fruits that cannot ripen once removed from the plant. Climacteric fruit produce much more ethylene than non-climacteric fruit. Climacteric fruits include apple, avocado, banana, blueberry, breadfruit, cantaloupe, cherimoya, durian, feijoa, fig, guava, kiwifruit, mango, muskmelon, papaya, passion fruit, pear, persimmon, plantain, quince, sapodilla, sapote, soursop, apricot, nectarine, peach, plum, quince, and tomato. Some fruits, such as apples and bananas, produce more ethylene gas than other climacteric fruits. Non-climacteric fruit include blackberry, cherry, cucumber, eggplant, grape, grapefruit, lemon, lime, orange, pepper, pineapple, pomegranate, pumpkin, raspberry, squash, strawberry, watermelon, and zucchini.

For non-climacteric fruit, increasing evidence indicates that the phytohormone abscisic acid (ABA) plays an important role in accelerating fruit ripening. The inventors have surprisingly shown ABA agonists that delay seed germination and promote fruit ripening and pigmentation. The inventors have shown that N-(4-bromo-2-ethylphenyl)-1-ethyl-1H-pyrazole-3-carboxamide (CAD) has potential as an effective regulator of plant/plant part sprouting and promoter of fruit ripening and pigmentation. Similarly, the inventors have shown that N-(4-bromophenyl)-1-ethyl-1H-pyrazole-3-carboxamide, a chemical with 90% similarity to CAD, also has an effect on fruit ripening.

In an embodiment, the invention relates to a composition comprising an ABA agonist for delaying plant/plant part germination/sprouting and/or promoting fruit ripening and pigmentation. The compositions of the invention may comprise a surfactant, for example, TRITON-X100 surfactant (polyethylene glycol tert-octylphenyl ether); TRITON-X100 reduced surfactant (polyoxyethylene (10) isooctylcyclohexyl ether); BRIJ C10 (Polyoxyethylene (10) cetyl ether); polysorbate 20; octylphenoxypoly ethoxyethanol; or nonylphenoxypolyethoxyethanol.

In some embodiments of the invention, a composition of the invention may further comprise at least one additional chemical that is useful for reducing weeds, or reducing pests. In some embodiments of the invention, the composition comprising at least one ABA agonist further comprises at least one of a fungicide, an herbicide, a pesticide, a nematicide, an insecticide, a plant activator, a synergist, an herbicide safener, a plant growth regulator, an insect repellant, an acaricide, a molluscicide, or a fertilizer. In some embodiments of the invention, the composition comprising an ABA agonist further comprises a surfactant. In some embodiments of the invention, the composition comprising an ABA agonist further comprises a carrier.

In an embodiment, the invention relates to a kit comprising a composition comprising at least one ABA agonist for delaying plant/plant part germination/sprouting and/or hastening fruit ripening and pigmentation. In some embodiments, the ABA agonist in the composition for delaying plant/plant part germination and/or hastening fruit ripening and pigmentation is N-(4-bromo-2-ethylphenyl)-1-ethyl-1H-pyrazole-3-carboxamide; N-(4-bromophenyl)-1-ethyl-1H-pyrazole-3-carboxamide; 4-bromo-N-(2-tert-butylphenyl)-1-ethyl-1H-pyrazole-3-carboxamide; 1-[(4-methoxyphenyl) sulfonyl]-3-piperidinecarboxamide; N-(3,4-dimethylphenyl)-N-(4-fluorobenzyl)methanesulfonamide, [3-(benzyloxy)benzyl]methylamine hydrochloride; 4-amino-2-(5,7-dimethyl-1,3-benzoxazol-2-yl)-6-methylphenol: N-cyclopropyl-N'-(2,3-dimethylphenyl)urea; N-[3-(1,3-benzoxazol-2-yl)-2-methylphenyl]-2-methylpropanamide; 3-[(2-fluorobenzyl)oxy]benzamide, N-[3-chloro-4-(4-propionyl-1-piperazinyl)phenyl]-2-methoxy-3-methylbenzamide, 6-chloro-N-(2,4-dimethylphenyl)-2-oxo-2H-chromene-3-carboxamide, or methyl 2-{[(4-cyclohexyl-1-piperazinyl)carbonyl]amino}benzoate.

In an embodiment, the invention provides a method for delaying plant or plant part germination/sprouting, and/or promoting fruit ripening and pigmentation. The method comprising the step of contacting a plant or a plant part with a sufficient amount of a composition comprising an ABA agonist to delay germination/sprouting and/or promote fruit ripening and pigmentation compared to the germination/sprouting, and/or fruit ripening and pigmentation of a plant or plant part not contacted with the composition. In some embodiments of the invention, the plant or plant part contacted with a composition of the invention is monocotyledonous. In some embodiments of the invention, the plant or plant part contacted with a composition of the invention is dicotyledonous.

A composition comprising at least one ABA agonist can be applied to plants or plant parts using at least one of a variety of methods known in the art. The composition comprising at least one ABA agonist may be applied to the target plant or plant part using a variety of conventional methods such as dusting, coating, injecting, rubbing, rolling, dipping, spraying, or brushing, or any other appropriate technique which does not significantly injure the target plant or plant part to be treated. Methods of applying the composition comprising at least one ABA agonist to plants or plant parts may be, e.g., by spraying, atomizing, dipping, pouring, irrigating, dusting, or scattering the compositions over the propagation material, or by brushing or pouring the composition over the plant or plant part. When the plant part is a seed, application may be done, for example, by injecting, coating, encapsulating, atomizing, spraying, dipping, or immersing the seed in a liquid composition comprising an ABA agonist, or otherwise treating the seed. When the plant part is a fruit, application of a composition comprising an ABA agonist may be done by dusting, coating, injecting, rubbing, rolling, dipping, spraying, or brushing, or any other appropriate technique which does not significantly injure the fruit. In an alternative, the compositions comprising an ABA agonist can be introduced into the soil by spraying, scattering, pouring, irrigating, or otherwise treating the soil.

Compositions comprising an ABA agonist may be in any customary form suitable for application, such as solutions, emulsions, wettable powders, water-based suspensions, oil-based suspensions, powders, dusts, pastes, soluble powders, soluble granules, granules for broadcasting, suspension-emulsion concentrates, natural materials impregnated with active compound, synthetic materials impregnated with active compound, fertilizers, or microencapsulation in polymeric substances. Compositions comprising an ABA agonist may be produced in a known manner, for example by mixing the ABA agonists with suitable adjuvants, extenders, and/or surfactants. Extenders may be liquid solvents and/or solid carriers. Surfactants may be emulsifiers and/or dispersants and/or foam-formers. The compositions may be prepared ahead of time, immediately before application, or during application.

The ABA agonists for use in the present invention may be used in conjunction with an adjuvant, which aids absorption of the compound into the desired seed, plant, plant part, and/or fruit. Suitable adjuvants include inorganic or organic chemicals and macromolecules, or any mixtures thereof. In particular embodiments of the present invention, the adjuvant may predominantly consist of methyl or ethyl esters (or mixtures thereof) of fatty acids originating from plant oils, optionally the plant oils may be selected from sunflower oil, canola oil, rapeseed oil, soybean oil, corn oil, or the like. By way of example, suitable adjuvants for use in the present invention include HASTEN, KWICKEN, UPTAKE, ROCKET, AUREO, STEFES MERO, DYNE-AMIC, BIOPEST, AGRIDEX, or ZAP. In another embodiment of the present invention, the adjuvant may be from the class of polyalkoxylated triglycerides that may be described by CAS 70377-91-2 or CAS 165658-61-7 and that are commercially available. In an embodiment, the adjuvant may be selected from a class of $C_8$-$C_{10}$ polyethoxylated fatty alcohols. By way of example, suitable adjuvants may be selected from the class of polyethoxylated alcohols that may be described by CAS 9043-30-5 or 27213-90-7, and that are commercially available. In an embodiment, the adjuvant may be selected from a class of $C_8$-$C_{10}$ polyalkoxylated fatty alcohols. By way of example, suitable adjuvants may be selected from the class of polypropoxylated-ethoxylated alcohols that may be described by CAS 64366-70-7 and that may be commercially available.

Unless otherwise explained, all technical and scientific terms used herein have the same meaning as commonly understood by one of ordinary skill in the art to which this disclosure belongs. The singular terms “a”, “an”, and “the” include plural referents unless context clearly indicates otherwise. Similarly, the word “or” is intended to include “and” unless the context clearly indicate otherwise.

As used herein, the term “mock-treated” means that the seed, plant, plant part, or fruit has been treated with buffer in the absence of at least one ABA agonist.

As used herein, the term “ABA agonist” refers to a molecule that has the capacity to initiate the same reaction or activity typically produced by ABA action.

As used herein, the term "exposing" means generally bringing into contact with. Exposure may be direct or indirect. Exposure of seed, fruit, plant, or plant part to a compound of the invention includes administration of the compound to the seed, fruit, plant, or part thereof, otherwise bringing the seed, fruit, plant, or part thereof (e.g. leaves or roots) into contact with the compound itself. Contacting with the compound may be done by spraying, immersing, injecting the seed, fruit, plant, or part thereof; or by contacting with the compound a surface or solution in which the seed, plant, fruit, or part thereof is present. In the present disclosure, the terms "exposing," "administering," "contacting," and variations thereof may, in some contexts, be used interchangeably.

As used herein, the term "sufficient amount" denotes an amount of a composition comprising at least one ABA antagonist sufficient to promote seed germination, and/or to delay fruit ripening and pigmentation, and which does not result in damage to the plant or plant part. Such amount can vary in a broad range and is dependent on various factors such as the plant or plant part exposed, the climatic and/or soil conditions, and the specific ABA antagonist in the composition.

As used herein, the term "fleshy fruit" refers to fruit consisting largely of soft succulent tissue.

As used herein, the term "about" is defined as plus or minus ten percent of a recited value. For example, about 1.0 g means 0.9 g to 1.1 g.

As used herein, it is intended that reference to a range of numbers (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

As used herein, the term "carrier" includes a natural or synthetic, organic or inorganic solid or liquid substance with which an active compound is mixed or bonded, for example to provide better applicability, in particular for application to plants or parts of plants. The carrier, which may be solid or liquid, is generally inert and should be suitable for use in agriculture.

As used herein, the term "adjuvant" includes an agent that modifies the effect of the active compound for use in the present invention. An adjuvant may be an auxiliary. Suitable auxiliaries for use in the present invention include substances that are suitable for imparting to the composition itself and/or to preparations derived therefrom (for example spray liquors, seed dressings) particular properties such as certain technical properties and/or also particular biological properties. Typical suitable auxiliaries are: extenders, solvents and carriers.

Suitable solid carriers for use in the present invention include, for example, ammonium salts, ground natural minerals, and ground synthetic minerals. These may be selected from at least kaolins, clays, talc, chalk, quartz, attapulgite, montmorillonite, or diatomaceous earth. Suitable solid carriers for granules include, for example, crushed and fractionated natural rocks, synthetic granules of inorganic and organic meals, granules of organic material. Suitable emulsifiers and/or foam-formers include, for example, non-ionic and anionic emulsifiers, such as polyoxyethylene fatty acid esters, polyoxyethylene fatty alcohol ethers, for example alkylaryl polyglycol ethers, alkylsulphonates, alkyl sulphates, arylsulphonates and also protein hydrolysates; suitable dispersants are nonionic and/or ionic substances, for example from the classes of the alcohol/POE and/or POP ethers, acid and/or POP/POE esters, alkylaryl and/or POP/POE ethers, fat and/or POP/POE adducts, POE and/or POP polyol derivatives, POE and/or POP/sorbitan or sugar adducts, alkyl or aryl sulphates, sulphonates and phosphates, or the corresponding PO ether adducts. Suitable oligomers or polymers, for example those derived from vinylic monomers, from acrylic acid, from EO and/or PO alone or in combination with, for example, (poly) alcohols or (poly) amines. It is also possible to employ lignin and its sulphonic acid derivatives, unmodified and modified celluloses, aromatic and/or aliphatic sulphonic acids and their adducts with formaldehyde.

Embodiments of the present invention are shown and described herein. It will be obvious to those skilled in the art that such embodiments are provided by way of example only. Numerous variations, changes, and substitutions will occur to those skilled in the art without departing from the invention. Various alternatives to the embodiments of the invention described herein may be employed in practicing the invention. It is intended that the included claims define the scope of the invention and that methods and structures within the scope of these claims and their equivalents are covered thereby. All publications, patents, and patent applications mentioned in this specification are herein incorporated by reference to the same extent as if each individual publication, patent, or patent application was specifically and individually indicated to be incorporated by reference.

EXAMPLES

Having now generally described this invention, the same will be better understood by reference to certain specific examples, which are included herein only to further illustrate the invention and are not intended to limit the scope of the invention as defined by the claims.

Example 1

Chemical Library Screening

Chemical libraries of small compounds were screened for compounds capable of delaying seed germination, promoting the ripening process, and/or hastening fruit pigmentation.

A chemical library containing 10,000 small compounds (~300 Dalton) was purchased from ChemBridge Co (San Diego, California, USA). Strawberry seeds (*Fragaria x ananassa* CV. Albion) were purchased from Johnny's Seeds (Fairfield, Maine, USA). Five to six seeds were sterilized with 70% ethanol and added to each well of 96 well ELISA plates containing about 5 μM chemical 0.1% TRITON X-100 surfactant (polyethylene glycol tert-octylphenyl ether). One mM abscisic acid (ABA), a hormone that inhibits seed germination, and gibberellic acid (GA3), a hormone that promotes seed germination, were used as controls. Each experiment was conducted in triplicate. Plates were kept in a growth chamber at 25° C. under dark, and a 14 hour light/10 hour dark cycle was added after seed germination was observed. Thirteen chemicals that showed significant effect in delaying seed germination were selected for testing the effects on fruit development and ripening.

The thirteen chemicals identified in this example as delaying seed germination are listed below:

N-(4-bromo-2-ethylphenyl)-1-ethyl-1H-pyrazole-3-carboxamide

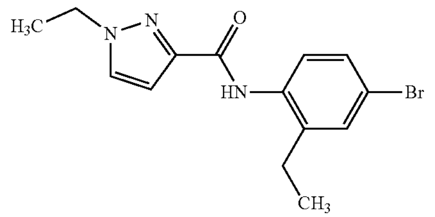 [SMILES: CCc1cc(Br)ccc1NC(=O)c1ccn(CC)n1]

N-(4-bromophenyl)-1-ethyl-1H-pyrazole-3-carboxamide, 4-bromo-N-(2-tert-butylphenyl)-1-ethyl-1H-pyrazole-3-carboxamide, 1-[(4-methoxyphenyl) sulfonyl]-3-piperidinecarboxamide, N-(3,4-dimethylphenyl)-N-(4-fluorobenzyl) methanesulfonamide, [3-(benzyloxy)benzyl]methylamine hydrochloride, 4-amino-2-(5,7-dimethyl-1,3-benzoxazol-2-yl)-6-methylphenol, N-cyclopropyl-N'-(2,3-dimethylphenyl)urea, N-[3-(1,3-benzoxazol-2-yl)-2-methylphenyl]-2-methylpropanamide, 3-[(2-fluorobenzyl)oxy]benzamide, N-[3-chloro-4-(4-propionyl-1-piperazinyl)phenyl]-2-methoxy-3-methylbenzamide, 6-chloro-N-(2,4-dimethylphenyl)-2-oxo-2H-chromene-3-carboxamide, methyl 2-{[(4-cyclohexyl-1-piperazinyl)carbonyl]amino}benzoate.

The effects on fruit development for each of these chemicals were tested. Each of these chemicals hastened fruit development to a different extent.

In this example thirteen chemicals were identified with the ability to delay seed germination compared to non-treated or mock-treated seeds.

Example 2

Treatment of Strawberry Fruit

One of the thirteen chemicals identified in Example 1 as delaying seed germination was tested for its effect on strawberry fruit ripening.

Strawberry plants (*Fragaria x ananassa* CV. Albion) were grown in a greenhouse at 28° C. and 14-hour light/10-hour dark conditions. Eight days after pollination, fruits were dipped for 20 seconds in 10 μM CAD in 0.1% TRITON X-100 surfactant; 1 mM ABA in 0.1% TRITON X-100 surfactant; or buffer alone (0.1% TRITON X-100 surfactant). Fruits were allowed to continue growing on the plants. FIG. 1 depicts images of strawberry fruit development under standard conditions. This figure shows that in the normal developing process, the red color first starts to appear on the strawberry at day 16 or 17 after pollination.

Figure 2A:
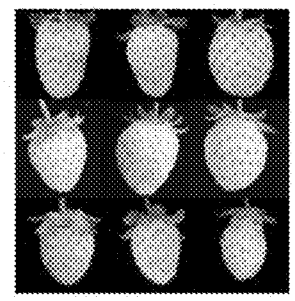
FIG. 2A to FIG. 2F depict images of 8 day old strawberry fruit taken at different days after treatment (DAT) with either 10 μM N-(4-bromo-2-ethylphenyl)-1-ethyl-1H-pyrazole-3-carboxamide (CAD) in 0.1% TRITON-X100 surfactant; 1 mM abscisic acid (ABA) in 0.1% TRITON-X100 surfactant; or buffer alone (0.1% TRITON-X100 surfactant; Mock).
Figure 2B:
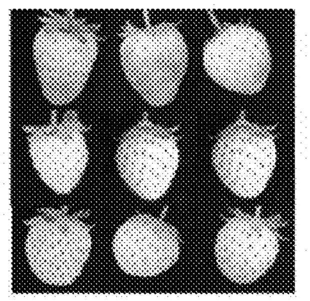
Figure 2C:
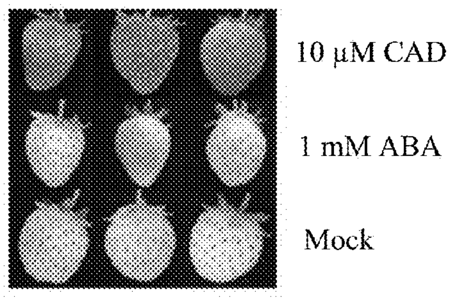
Figure 2D:
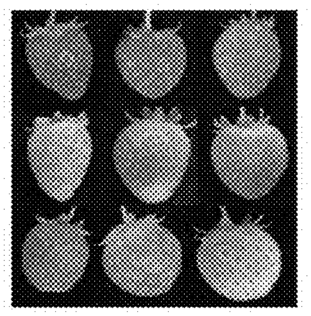
Figure 2E:
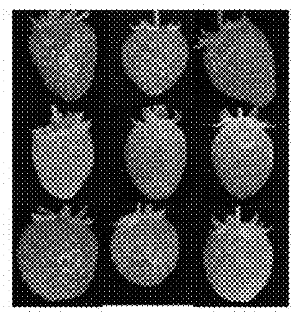
Figure 2F:
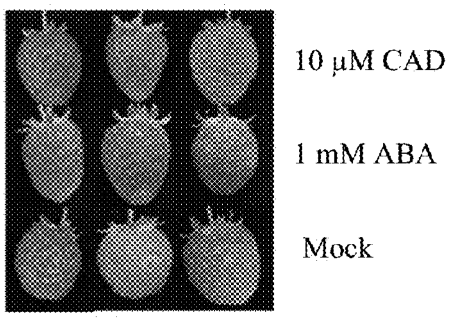

Of the thirteen chemicals identified in Example 1 as delaying seed germination, N-(4-bromo-2-ethylphenyl)-1-ethyl-1H-pyrazole-3-carboxamide was named "CAD," and used for further study. FIG. 2A to FIG. 2F depict images of strawberries treated with either 10 μM CAD in 0.1% TRITON X-100 surfactant; 1 mM ABA in 0.1% TRITON X-100 surfactant; or buffer (0.1% TRITON X-100 surfactant) without chemical (mock-treated). FIG. 2A shows images of strawberries 7 days after treatment (DAT); FIG. 2B shows images of strawberries at 8 DAT; FIG. 2C shows images of strawberries at 9 DAT; FIG. 2D shows images of strawberries at 10 DAT; FIG. 2E shows images of strawberries at 11 DAT; and FIG. 2F shows images of strawberries at 12 DAT. As seen in FIG. 2A to FIG. 2F, CAD and ABA stimulated strawberry fruit ripening when compared to mock-treated strawberries. The CAD dosage was lower than that of ABA (10 μM vs. 1 mM), and CAD stimulated fruit ripening faster than did ABA. As seen in FIG. 2A, seven days after treatment (DAT), CAD-treated fruit began to turn red, and reached full red 9 DAT (see FIG. 2C). In contrast, ABA-treated fruit started to turn red 9 DAT, and reached full red 11 DAT.

There was no difference in the sugar content, or the fresh weight of strawberry fruit treated with CAD, treated with ABA, or mock-treated.

This Example shows that at least one of the compounds shown in Example 1 to delay seed germination, CAD, also promoted strawberry fruit ripening when compared to strawberries treated with ABA or buffer alone. The CAD dose was lower (10 μM) than that of ABA (1 mM); and ripening of the strawberries started sooner with CAD (7 DAT) than with ABA (9 DAT).

Example 3

Treatment of Cherry Tomatoes

The possibility of CAD having an effect on ripening of climacteric fruits was tested.

Figure 3A:
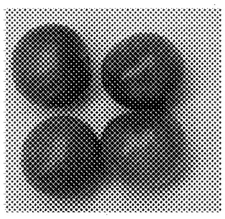
FIG. 3A to 3H depict images of cherry tomatoes taken on the day of treatment or taken 6 DAT.
Figure 3B:
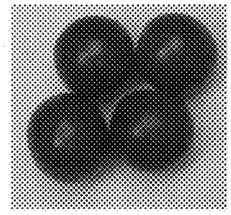
Figure 3C:
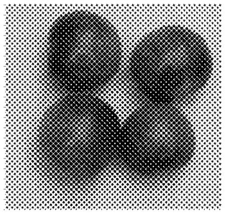
Figure 3D:
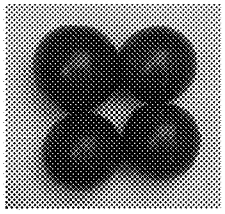
Figure 3E:
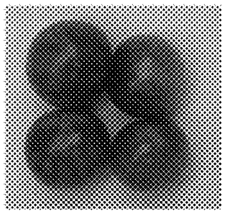
Figure 3F:
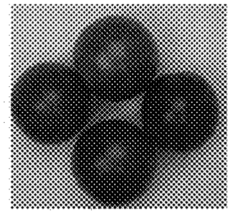
Figure 3G:
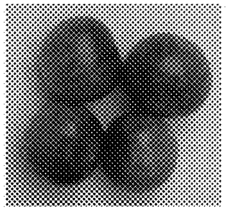
Figure 3H:
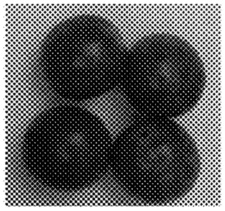

Cherry tomato fruits at mature green stage were purchased from Butler's Orchard (Germantown, Maryland, USA). Each fruit was injected with either 50 μM CAD in 0.1% TRITON X-100 surfactant; 200 μM ABA in 0.1% TRITON X-100 surfactant; or buffer alone (0.1% TRITON X-100 surfactant). Six days after treatment CAD-treated fruits and ABA-treated fruits were fully ripen (red stage), while at the same time point, untreated fruits and mock-treated fruits (treated with buffer alone) were at a pink stage. FIG. 3A and FIG. 3B show images of cherry tomatoes injected with 10 μM CAD. FIG. 3C and FIG. 3D show images of cherry tomatoes injected with 200 μM ABA. FIG. 3E and FIG. 3F show images of cherry tomatoes injected with buffer alone. FIG. 3G and FIG. 3H show images of untreated tomatoes. FIG. 3A; FIG. 3C; FIG. 3E; and FIG. 3G show images taken the day of treatment. FIG. 3B; FIG. 3D; FIG. 3E; and FIG. 3H show images taken 6 DAT. These figures clearly show that CAD treatment results in hastening of cherry tomato ripening when compared to mock-treated cherry tomatoes, or untreated cherry tomatoes.

The results in this example show that, same as with non-climacteric strawberries, CAD promoted fruit ripening of climacteric tomatoes. While not much difference was observed in the rate of ripening when comparing the results obtained when using CAD or ABA. But, this effect was seen when using CAD at 10 μM and ABA at 1 mM. Thus, the amount (dose) of CAD necessary to hasten tomato ripening is lower than the amount of ABA that has the same effect.

Example 4

CAD Analogs

Chemicals with similarity to CAD were tested for their ability to hasten fruit ripening.

To the inventors' knowledge, no chemical closely related to CAD is currently commercially available. A few analogs with 88-90% similarity to CAD were found in the ChemBridge database used in Example 1.

When 50 μM of N-(4-bromophenyl)-1-ethyl-1H-pyrazole-3-carboxamide in 0.1% TRITON-X 100 surfactant were applied at the same timing as CAD, the compound promoted strawberry fruit ripening, although not as effectively as CAD. This compound has 90% similarity to CAD.

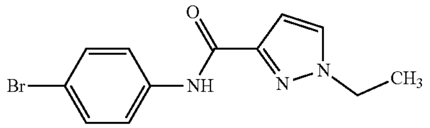 [SMILES: CCn1ccc(C(=O)Nc2ccc(Br)cc2)n1]

When 50 μM of 1-ethyl-N-(2-ethyl-6-methylphenyl)-1H pyrazole-3-carboxamide in 0.1% TRITON-X 100 surfactant were applied at the same timing as CAD, the compound had no obvious effect on fruit ripening. This compound also has 90% similarity to CAD.

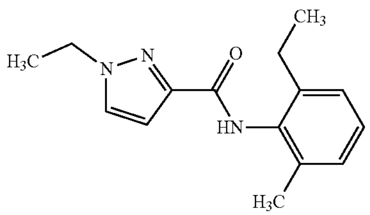 [SMILES: CCc1cccc(C)c1NC(=O)c1ccn(CC)n1]

When 50 μM of 4-bromo-N-(2-tert-butylphenyl)-1-ethyl-1H-pyrazole-3-carboxamide in 0.1% TRITON-X 100 surfactant were applied at the same timing as CAD, the compound had a lower effect on fruit ripening than CAD. This compound has 88% similarity to CAD.

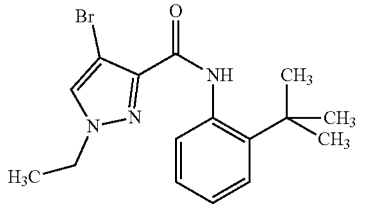 [SMILES: CCn1cc(Br)c(C(=O)Nc2ccccc2C(C)(C)C)n1]

The results shown in this Example indicate that a chemical with 90% similarity to CAD promotes fruit ripening, albeit not as effectively as CAD. The results also indicate that other chemicals with similarity to CAD had no obvious effect on fruit ripening.

Example 5

Effect of CAD Injection on Fruit Ripening

The effect of injecting CAD on fruit ripening was tested.

Figure 4A:
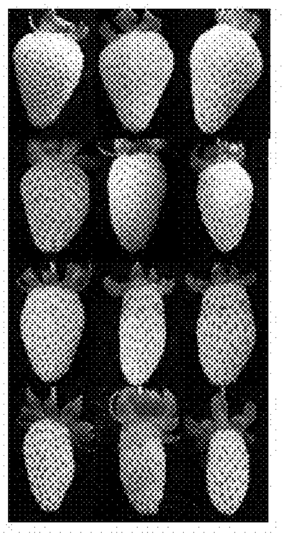
FIG. 4A to FIG. 4F depict images of 7 day old strawberry fruit taken at different days after treatment with 10 μM CAD in 0.1% TRITON-X100 surfactant; 200 μM ABA in 0.1% TRITON-X100 surfactant; or 0.1% TRITON-X100 surfactant (Mock) or no treatment (Control).
Figure 4B:
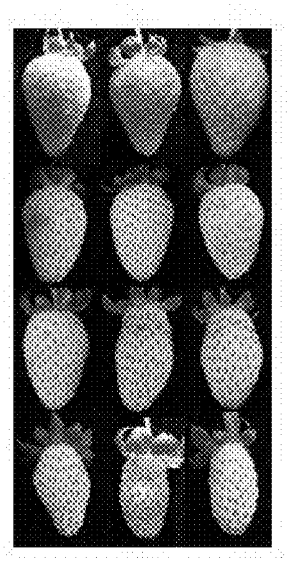
Figure 4C:
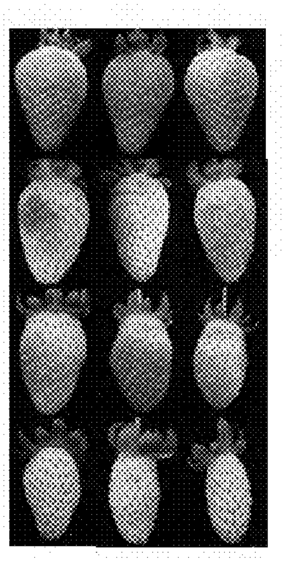
Figure 4D:
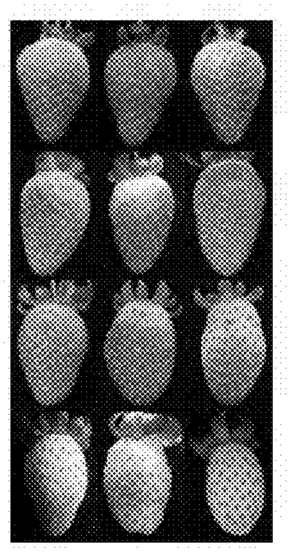
Figure 4E:
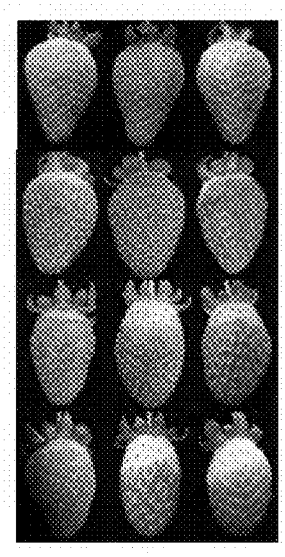
Figure 4F:
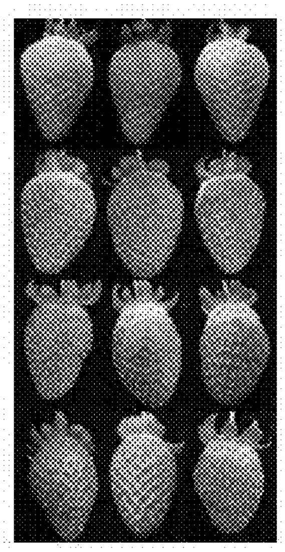

While still on the plant, strawberries were injected with either 10 μM CAD in 0.1% TRITON-X 100 surfactant; 200 μM ABA in 0.1% TRITON-X 100 surfactant; or 0.1% TRITON-X 100 surfactant. The strawberries were allowed to remain on the plant, and removed and photographed at 8 DAT, 9 DAT, 10 DAT, 11 DAT, 12 DAT, and 13 DAT. FIG. 4A to FIG. 4F depict images of strawberries treated with either 10 μM CAD in 0.1% TRITON-X 100 surfactant; 200 μM ABA in 0.1% TRITON-X 100 surfactant; or 0.1% TRITON-X 100 surfactant alone (mock); or no treatment. FIG. 4A shows images of strawberries 8 days after treatment (DAT); FIG. 4B shows images of strawberries 9 DAT; FIG. 4C shows images of strawberries 10 DAT; FIG. 4D shows images of strawberries 11 DAT; FIG. 4E shows images of strawberries 12 DAT; FIG. 4F shows images of strawberries 13 DAT.

FIG. 4B shows that at 9 DAT untreated strawberries, mock-treated strawberries were still white, while CAD-treated strawberries showed some color. As seen on FIG. 4C, by 10 DAT the strawberries treated with CAD were ripe.

The results shown in this Example indicate that injecting fruit with CAD may shorten the ripening time of non-climacteric fruit.

We claim:

1. A plant or plant part sprouting/germination delaying-and/or fruit ripening and pigmentation-promoting composition, the composition comprising a carrier, adjuvant, auxiliary, extender, or surfactant, and at least one abscisic acid (ABA) agonist, wherein the at least one ABA agonist is N-(4-bromo-2-ethylphenyl)-1-ethyl-1H-pyrazole-3-carboxamide (CAD), N-(4-bromophenyl)-1-ethyl-1H-pyrazole-3-carboxamide, or 4-bromo-N-(2-tert-butylphenyl)-1-ethyl-1H-pyrazole-3-carboxamide.

2. The composition of claim 1, wherein the composition comprises a surfactant.

3. The composition of claim 2, wherein the surfactant is polyethylene glycol tert-octylphenyl ether; polyoxyethylene (10) isooctylcyclohexyl ether; polyoxyethylene (10) cetyl ether; polysorbate 20; octylphenoxypolyethoxyethanol; or nonylphenoxypolyethoxyethanol.

4. The composition of claim 1, wherein the at least one ABA agonist is N-(4-bromo-2-ethylphenyl)-1-ethyl-1H-pyrazole-3-carboxamide (CAD).

5. A plant or plant part germination/sprouting-delaying, and/or fruit ripening and pigmentation-hastening kit, the kit comprising a composition comprising a carrier, adjuvant, auxiliary, extender, or surfactant, and at least one ABA agonist, wherein the at least one ABA agonist is N-(4-bromo-2-ethylphenyl)-1-ethyl-1H-pyrazole-3-carboxamide (CAD), N-(4-bromophenyl)-1-ethyl-1H-pyrazole-3-carboxamide, or 4-bromo-N-(2-tert-butylphenyl)-1-ethyl-1H-pyrazole-3-carboxamide.

6. The kit of claim 5, wherein the kit comprises a surfactant.

7. The kit of claim 6, wherein the surfactant is polyethylene glycol tert-octylphenyl ether; polyoxyethylene (10) isooctylcyclohexyl ether; polyoxyethylene (10) cetyl ether; polysorbate 20; octylphenoxypolyethoxyethanol; or nonylphenoxypolyethoxyethanol.

8. The kit of claim 5, wherein the at least one ABA agonist is N-(4-bromo-2-ethylphenyl)-1-ethyl-1H-pyrazole-3-carboxamide (CAD).

9. A-plant or plant part germination/sprouting-delaying and/or fruit ripening and pigmentation-hastening method, the method comprising exposing a plant, a plant part, or a fruit to a sufficient amount of a composition comprising a carrier, adjuvant, auxiliary, extender, or surfactant, and at least one ABA agonist to delay germination and/or fruit ripening and pigmentation, wherein the at least one ABA agonist is N-(4-bromo-2-ethylphenyl)-1-ethyl-1H-pyrazole-3-carboxamide (CAD), N-(4-bromophenyl)-1-ethyl-1H-pyrazole-3-carboxamide, or 4-bromo-N-(2-tert-butylphenyl)-1-ethyl-1H-pyrazole-3-carboxamide.

10. The method of claim 9, wherein the composition comprises a surfactant.

11. The method of claim 10, wherein the surfactant is polyethylene glycol tert-octylphenyl ether; polyoxyethylene (10) isooctylcyclohexyl ether; polyoxyethylene (10) cetyl ether; polysorbate 20; octylphenoxypolyethoxyethanol; or nonylphenoxypolyethoxyethanol.

12. The method of claim 9, wherein the ABA agonist is N-(4-bromo-2-ethylphenyl)-1-ethyl-1H-pyrazole-3-carboxamide (CAD).

13. The method of claim 9, wherein the plant or plant part exposed to a composition comprising at least one ABA agonist is a fleshy fruit.

14. The method of claim 9, wherein the plant or plant part exposed to a composition comprising at least one ABA agonist is a seed.

* * * * *